(12) United States Patent
Kraus et al.

(10) Patent No.: US 7,237,785 B2
(45) Date of Patent: Jul. 3, 2007

(54) ROLL STABILIZER FOR THE CHASSIS OF A MOTOR VEHICLE

(75) Inventors: Manfred Kraus, Herzogenaurach (DE); Jürgen Osterlänger, Emskirchen (DE); Harald Hochmuth, Hagenbüchach (DE); Thomas Dirnberger, Obermichelbach (DE); Wolfgang Reik, Bühl (DE); Thomas Pfund, Leiberstung (DE)

(73) Assignees: Schaeffler KG, Herzogenaurach (DE); Luk Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 11/113,779

(22) Filed: Apr. 25, 2005

(65) Prior Publication Data
US 2005/0211518 A1    Sep. 29, 2005

Related U.S. Application Data

(63) Continuation of application No. PCT/EP03/11717, filed on Oct. 23, 2003.

(30) Foreign Application Priority Data
Oct. 25, 2002 (DE) .............................. 102 50 028

(51) Int. Cl.
*B60G 11/20* (2006.01)

(52) U.S. Cl. .................. 280/124.106; 280/124.107; 280/124.152

(58) Field of Classification Search ............. 280/5.511, 280/5.506, 124.106, 124.107, 124.149, 124.152; 267/188, 191, 273, 277
See application file for complete search history.

(56) References Cited

U.S. PATENT DOCUMENTS

| | | | | |
|---|---|---|---|---|
| 4,973,077 A | * | 11/1990 | Kuwayama et al. | .. 280/124.107 |
| 5,251,926 A | * | 10/1993 | Aulerich et al. | ...... 280/124.152 |
| 6,318,737 B1 | * | 11/2001 | Marechal et al. | ........ 280/5.511 |
| 6,328,323 B1 | * | 12/2001 | Elser | ................... 280/124.152 |
| 6,361,033 B1 | * | 3/2002 | Jones et al. | .................. 267/187 |
| 6,425,585 B1 | * | 7/2002 | Schuelke et al. | ........ 280/5.511 |
| 6,428,019 B1 | * | 8/2002 | Kincad et al. | ........... 280/5.511 |

FOREIGN PATENT DOCUMENTS

| | | |
|---|---|---|
| DE | 198 46 275 | 12/1999 |
| DE | 198 55 343 | 6/2000 |
| DE | 100 02 455 | 7/2001 |
| DE | 100 37 486 | 2/2002 |
| EP | 1 057 666 | 12/2000 |
| EP | 1 057 667 | 12/2000 |

* cited by examiner

*Primary Examiner*—Ruth Ilan
(74) *Attorney, Agent, or Firm*—Volpe and Koenig, P.C.

(57) ABSTRACT

A vehicle roll stabilizer for the chassis of a motor vehicle is provided, with its actuator (3, 38) being energized with independent energy, as necessary, for counteracting a roll. The actuator (3, 38) is provided with at least one additional energy accumulator (33a, 57), with its stored energy additionally counteracting the roll.

19 Claims, 3 Drawing Sheets

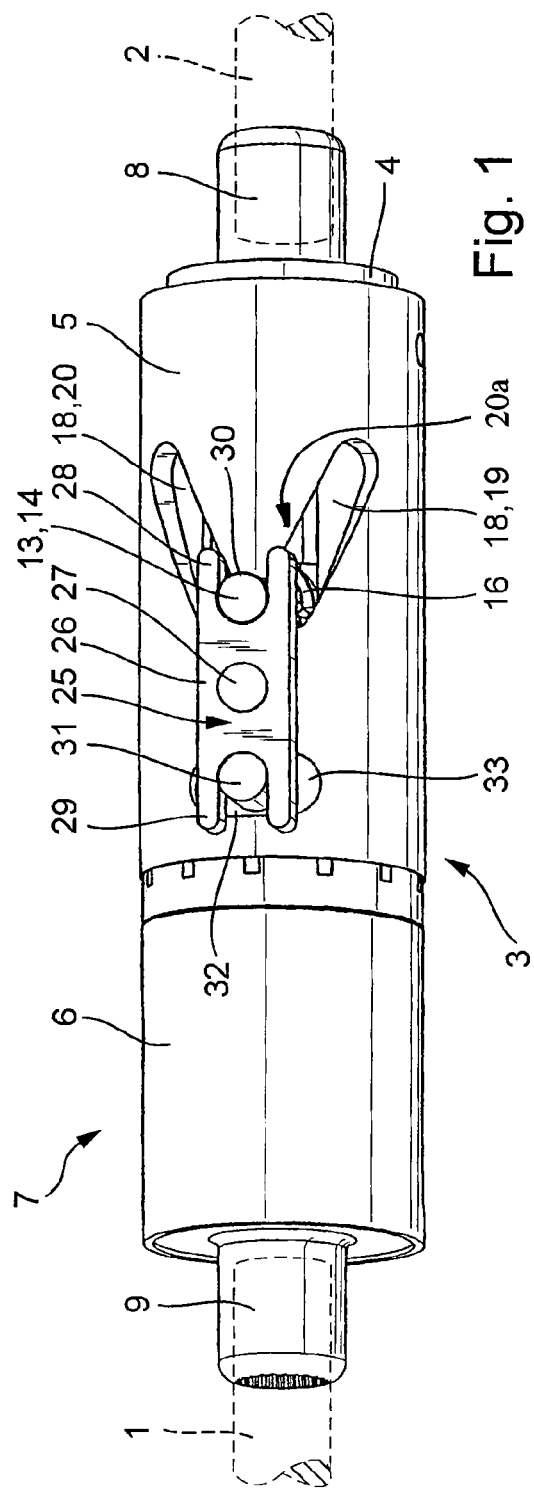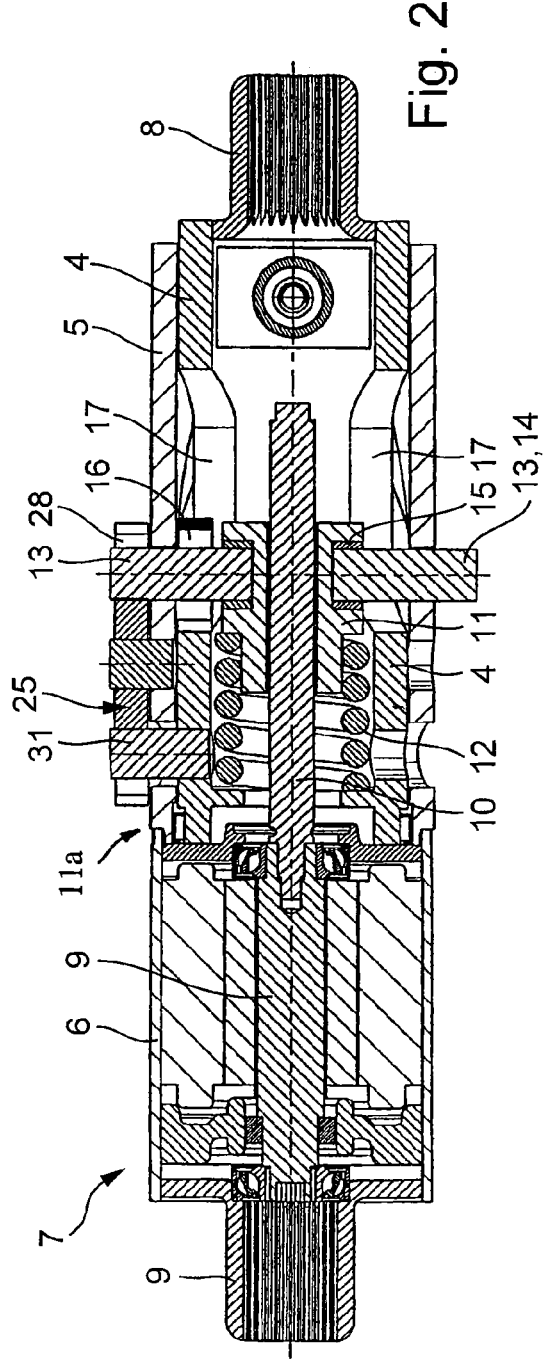

ROLL STABILIZER FOR THE CHASSIS OF A MOTOR VEHICLE

CROSS-REFERENCE TO RELATED APPLICATIONS

This application is a continuation of PCT/EP2003/011717, filed Oct. 23, 2003, which is incorporated herein by reference as if fully set forth.

FIELD OF THE INVENTION

The following invention relates to a roll stabilizer for the chassis of a motor vehicle. The object of said stabilizers is to reduce the tendency for the chassis to roll when driving through turns and to influence the behavior when driving through turns, i.e. to improve driving safety. As a rule, the stabilizer remains without any effect during equilateral suspension.

BACKGROUND

For example, a stabilizer arrangement for the chassis of a motor vehicle has been known from DE 100 02 455 A1, with its actuator energized with independent energy, counteracting any roll, if necessary. The actuator is provided with an electromechanical actuating drive, its rotor driving a threaded spindle provided with a threaded nut. A transmission is connected to this electromechanical actuating drive, converting a longitudinal shift of the threaded nut on the threaded spindle into a rotating motion around the rotational axis of the actuator. In this case, the actuator is allocated between two stabilizer halves and rotates them in reference to one another in order to counteract a roll. In the known arrangement, electric current is supplied as an independent energy driving the motor of the electromechanical actuating drive. However, hydraulic drives can be used as well, in which the hydraulic fluid moves a working piston, for example. These so-called active roll stabilizers must provide relatively great power, because the undesired roll moments of approximately 300 Nm have to be counteracted in only 400 milliseconds. Though hydraulic drive concepts can provide such power relatively easy, due to the high power density of hydraulic applications, electromechanically active roll stabilizers are bound by practical limits. Due to the fact that, using the conventionally installed 12 V vehicle power, the electric current required to provide such power usually results in unacceptably high values, which can lead to an unacceptable heating of the wiring harness. In hydraulic applications, appropriately strong pumps must be provided in order to ensure the necessary power, which increases the costs of the roll stabilizers.

SUMMARY

The object of the present invention is to provide an active roll stabilizer which is cost effective and fulfills the requirements of the demanded performances.

According to the invention, this objective is attained such that the actuator is provided with at least one additional energy accumulator, with its stored energy additionally counteracting the roll. The high power density required for the roll stabilizer according to the invention is provided through cooperation of the actuating drive energized with independent energy and the additional energy accumulator. The additional energy accumulator may be formed by a spring, for example. In general, any energy accumulator can be used, which can spontaneously release its stored energy and which can be replenished with the required amount of energy without any big expense. Therefore, in the exemplary embodiment in the form of a spring it is sufficient if the spring returns to its stressed stop position when the rolling moment is absent. In this way, using well-known electro mechanical drives the required power of the electric motor can be reduced considerably. Therefore, the roll stabilizer according to the invention can be used without any problems even in such motor vehicles equipped with 12 V vehicle power.

The additional energy accumulator is preferably installed in the actuator such that, in a single direction of stress release, it counteracts with its energy optionally a rolling in one rolling direction or in an opposite rolling direction. When, for example, a spring is used as an additional energy accumulator, which is kept in a compressed form under pre-stressing, it can release its energy through relaxation in a single direction of stress release, namely opposite to the direction in which it was compressed. In the following, measures are suggested how to utilize this supplementary energy for the roll compensation in both roll directions.

During the absence of a rolling moment, the actuator is in a neutral position, in which the additional energy accumulator is filled with energy, which, as soon as a rolling moment is present, can be used to counteract a roll by performing work. Therefore, a stopping device is preferably provided to hold the energy accumulator with the stored energy in a neutral position of the actuator.

Preferably, the actuator formed as a component comprises an actuating drive that can be energized with independent energy and through the additional energy accumulator. This further development according to the invention has the advantage that the roll stabilizer can be mounted between two stabilizer halves, for example, and can be connected to them as a pre-fabricated component of the chassis, here. Such components can also be advantageously provided with electric connectors, in order to allow the plugging in of control cables or input cables without any problems.

If the roll stabilizer according to the invention is implemented between two stabilizer halves, the actuator is constructed such that a turning around its rotational axis can be performed in order to rotate the stabilizer halves.

Advantageously, the additional energy accumulator is suitable for the use in roll stabilizers known, whose actuator effectively allocated between stabilizer halves is provided with a secondary first transmission in order to convert an adjustment path of the actuating drive into a rotational motion, if necessary, by which the stabilizer halves are rotated in reference to one another by a rotation angle around a rotational axis of the actuator. Here, the additional energy accumulator can release its energy for the rotation around the rotational axis of the actuator.

At the outset, DE 100 02 455 A1 has been mentioned, in which the first transmission comprises a first curved path transmission having two curved path carriers allocated to the stabilizer halves, in which, by way of an actuating drive, a first coupling element is guided along said first curved path with the first curved paths being different from one another. In such a roll stabilizer, in a further development according to the invention, a second curved path transmission can be provided at the two curved path carriers, with a second coupling element being guided longitudinally in said second curved paths, which are different from one another, by way of the additional energy accumulator. In this further development according to the invention, no additional curved path carriers are necessary for the embodiment of the second curved path transmission. Certainly, it is possible to provide any other transmission instead of the second curved path transmission in order to convert an axial relaxation path of the additional energy accumulator into a rotary motion, by which the stabilizer halves are rotated in reference to one another around a rotational angle.

However, if a second curved path transmission is provided, advantageously it is suggested for the curved path to be formed approximately V-shaped or U-shaped, with the two curved path branches being arranged symmetrical in a mirror reflection arrangement in reference to a longitudinal central plane containing the rotational axis of the actuator. This arrangement of the curved path according to the invention offers the essential advantage that the additional energy accumulator releases its stored energy in a single direction of relaxation. Either the stored energy operates and performs work by way of shifting the coupling element along one of the curved path branches or along the other curved path branch, so that a rotation of the two stabilizer halves is possible in one rotational direction or the opposite one.

Preferably, the two curved path branches merge in an interface contained in the longitudinal central plane. If the second coupling element is located in the interface, the additional energy accumulator is filled with stored energy. It is beneficial to provide the above-mentioned stop device at this interface. For example, this stop device may be embodied immediately at the curved path carriers, comprising the approximately V-shaped or U-shaped curved paths.

The second curved path transmission is preferably provided with a curved path allocated to the other curved path carrier, extending in a straight line parallel to the rotational axis of the actuator. When the second coupling element is simultaneously displaced along the curved paths of the two curved path carriers, a rotation of the two curved path carriers occurs in relation to one another, with this rotation serving to rotate the two curved path carriers in relation to one another in order to rotate the connected stabilizer halves.

The roll stabilizer according to the invention is suited in a particularly beneficial manner for the implementation of electro-mechanical actuating drives, with their electric motor driving a threaded spindle provided with a spindle nut. The power to be produced by the electric motor in the event of a roll can be reduced by the amount released by the additional energy accumulator. As a space-saving solution for an additional energy accumulator, which is embodied as a tension spring or a compression spring, it is suggested to provide a helical spring located around the rotational axis of the actuator. In the last described embodiment, the rotational axis of the actuator is identical with the rotational axis of the threaded spindle. In the case of the suggested helical spring, it may be advantageous in order to save axial space, to provide the successive windings of the helical spring with different winding diameters. In this case, the windings of the helical spring can at least partially overlap when compressed, so that considerably less axial construction space is required in the block position of the helical spring.

BRIEF DESCRIPTION OF THE DRAWINGS

In the following, the invention is described in greater detail using two exemplary embodiments shown in a total of five figures. Shown are:

FIG. 1 a perspective view of a roll stabilizer according to the invention,

FIG. 2 a longitudinal cross-sectional view of a roll stabilizer according to the invention, FIG. 3 a schematic representation of the mode of operation of the roll stabilizer according to the invention having a modified control, FIG. 4 a schematic representation of a longitudinal cross-section through a roll stabilizer according to the invention in a neutral position, and FIG. 5 a view of the roll stabilizer according to the invention, as shown in FIG. 4, in an operating position.

DETAILED DESCRIPTION OF THE PREFERRED EMBODIMENTS

Figure 3:
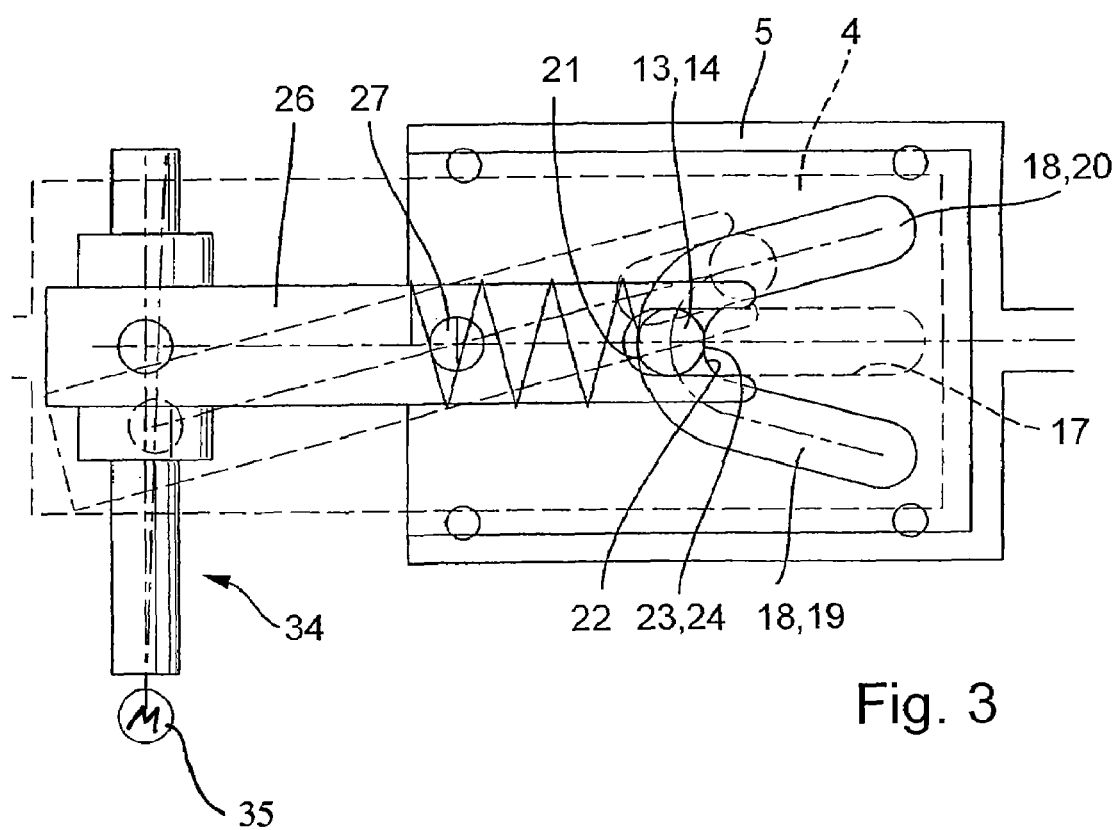

The roll stabilizer according to the invention shown in FIGS. 1 through 3 for the chassis of a motor vehicle comprises stabilizer halves 1, 2, only shown in dashed lines, here. Between the stabilizer halves 1, 2 an actuator 3 is allocated, which also represents the main item of the invention. The actuator 3 rotates the two stabilizer halves 1, 2, as necessary, around the rotational axis of the actuator 3 relative to one another.

The actuator 3 is provided with two curved path carriers 4, 5 nested coaxially in reference to one another. The two curved path carriers 4, 5 are provided in a tube-shaped form and are rotatable relative to one another. The exterior curved path carrier 5 is mounted with its left end to a housing 6 of an electric motor 7, as shown in FIG. 2. At their opposite face ends, the curved path carrier 4 and the housing 6 are each provided with a pin catch 8, 9 for the torque proof receiving of the ends of the stabilizer halves 1, 2.

A threaded spindle 10 is mounted to a rotor 9 of the electric motor 7. The threaded spindle 10 is arranged coaxially in reference to the two curved path carriers 4, 5. A spindle nut 11 is pivotally arranged on the threaded spindle 10 in the manner of a ball drive known per se. A relative rotation of the threaded spindle 10 in reference to the spindle nut 11 is converted into an axial motion of the spindle nut 11 in reference to the curved path carriers 4, 5. This arrangement forms an electromechanical actuating drive 11a.

A helical pressure spring 12 coaxially arranged on a threaded spindle 10 is, on the one hand, supported on the curved path carrier 4, and, on the other hand, cushioned against the spindle nut 11. The spindle nut 11 carries a coupling element 13 necessary for the rotation of the two curved path carriers 4, 5 in reference to one another, as explained in the following. The coupling element 13 comprises several adjustment pins 14 distributed over the circumference of the spindle nut 11, arranged in a star-shaped manner around the rotational axis of the actuator 3. The adjustment pins 14 are accepted in radial bearings 15 at the spindle nut 11, rotatable around their longitudinal axis. Support rolls 16 are rotatably supported on the adjustment pins 14.

At several positions, distributed over its circumference, the curved path carrier 4 is provided with generally straight-line curved paths 17 arranged parallel to the rotational axis of the actuator 3. At several positions each, distributed over its circumference, the curved path carrier 5 is provided with a V-shaped curved path 18, with its approximately V-shaped curved path branches 19, 20 being arranged approximately symmetrical in a mirror reflection arrangement in reference to a longitudinal central plane containing the rotational axis of the actuator 3. The V-shaped curved path 18 and/or its curved path branches 19, 20 are clearly discernible from FIGS. 1 and 3. The coupling elements 13 couple the two curved path carriers 4, 5 to one another. For this purpose, the adjustment pins 14 each engage both the curved path 17 as well as the V-shaped curved path 18. The support rolls 16 cooperate with the curved path 17, with the adjustment pins 14 each cooperating via their circumference with the V-shaped curved path 18. In this manner, a first curved path transmission 20a is formed secondary to the electromechanical actuating drive 11a. The two curved path branches 19, 20 of each V-shaped curved path 18 cross at an interface 21 contained in the longitudinal central plane, as indicated in FIG. 3. In a neutral position of the actuator 3, the coupling element 14, i.e. the adjustment pin 14, is arranged in the interface 21. For a perfect positioning of the adjustment pin 14, in the present example, a stop position 23 is provided in the interior wall 22 of the V-shaped curved path 18, as discernible from FIG. 3. This stop position 23 for the coupling element 13, i.e. the adjustment pin 14 here, is arranged laterally to the rotational axis of the actuator 3 and forms a plateau 24.

In the present invention, the electromechanical actuating drive 11a is provided, which includes the above-mentioned electric motor 7 with the connected ball drive. When a roll of the vehicle body is to be counteracted, in active roll stabilizers the two stabilizer halves are rotated in the opposite direction of the affecting rolling moment. Here, the rotation is achieved such that the electric motor 7 is activated, displacing the spindle nut 11, thus displacing each of the adjustment pins 14 provided in one of the two curved path branches 19, 20 along said curved path branch 19, 20. This means that the exterior curved path carrier 5 is rotated in reference to the adjustment pins 14 and in reference to the curved path carrier 4. When the adjustment pin 14 is located in the curved path branch 19, the relative rotation occurs counter clock-wise. When the adjustment pin 14 is located in the curved path branch 20, the relative rotation occurs clock-wise.

Depending on the orientation of the acting rolling moment it must be selected, into which of the two curved path branches 19, 20 the adjustment pin 14 shall be directed, originating from its neutral position in the interface 21. For this purpose, according to FIGS. 1 and 2, a control 25 is provided, by which the coupling element 13 can optionally be directed out of its neutral position into one of the two curved path branches 19, 20. This control 25 comprises a tilting bar 26 pivotal around a tilt axis 27. The tilt axis 27 is arranged laterally in reference to the rotational axis of the actuator 3. One end 28 of the tilting bar engages the coupling element 13 and the other end 29 of the tilting bar engages the other curved path carrier 4. In the present embodiment, the adjustment pin 14 engages a U-shaped catch 30 of the tilting bar 26 at its end 28 of the tilting bar. At the other end 29 of the tilting bar, pins 31 each engage a U-shaped catch 32 at the other end 29 of the tilting bar. The tilt axis 27 is mounted to the curved path carrier 5.

This control 25 can advantageously utilize the rolling moment in order to direct the coupling element 13 into the respective curved path branch 19, 20 of the V-shaped curved path. When, for example, due to a rolling moment, a relative rotation is initiated between the two stabilizer halves 1, 2 in the clock-wise direction, the pin 31 also pivots clock-wise and moves in the circumferential direction in reference to the curved path carrier 5. This relative rotation in reference to the curved path carrier 5 is possible because grooves 33 are provided in the curved path carrier 5, directed in the circumferential direction, penetrated by the pins 31. Now, the tilting bar 26 with its end 29 of the tilting bar pivots clock-wise and/or upwards, with reference to FIG. 1. Now, the tilting bar 26 with its end 28 of the tilting bar pivots counter clock-wise, i.e. downwards, considering FIG. 1. With this pivotal motion of the tilting bar 28 the adjustment pin 14 is displaced out of its stop position 23 and into the curved path section 19. The helical spring 12 now presses the spindle nut 11 axially to the right. The farther the coupling element 13 is displaced to the right, the larger the rotation between the two curved path carriers 4, 5, so that the rolling moment is actively counteracted.

The helical spring 12 is an energy accumulator 33a and supports the electric motor 7. In the starting phase of the electric motor 7, the pre-stressed helical spring 12 supports with its full force the desired adjustment process, and thus enables a very rapid adjustment compensating for the rolling moment. Via any suitable control, the motor 7 can now be controlled such that, after the rolling moment ceases, the coupling element 13 is returned to its neutral position, with the helical pressure spring 12 again retaining its full pre-stressed force.

FIG. 3 shows, in a schematic representation, an alternative control 34, in which the tilting bar 26 is activated via an electrically driven actuating motor 35. Similar to the above-described control, the pivotal motion of the tilting bar 26 occurs in one of the two rotational directions, depending on the determined rolling moment.

Figure 4:
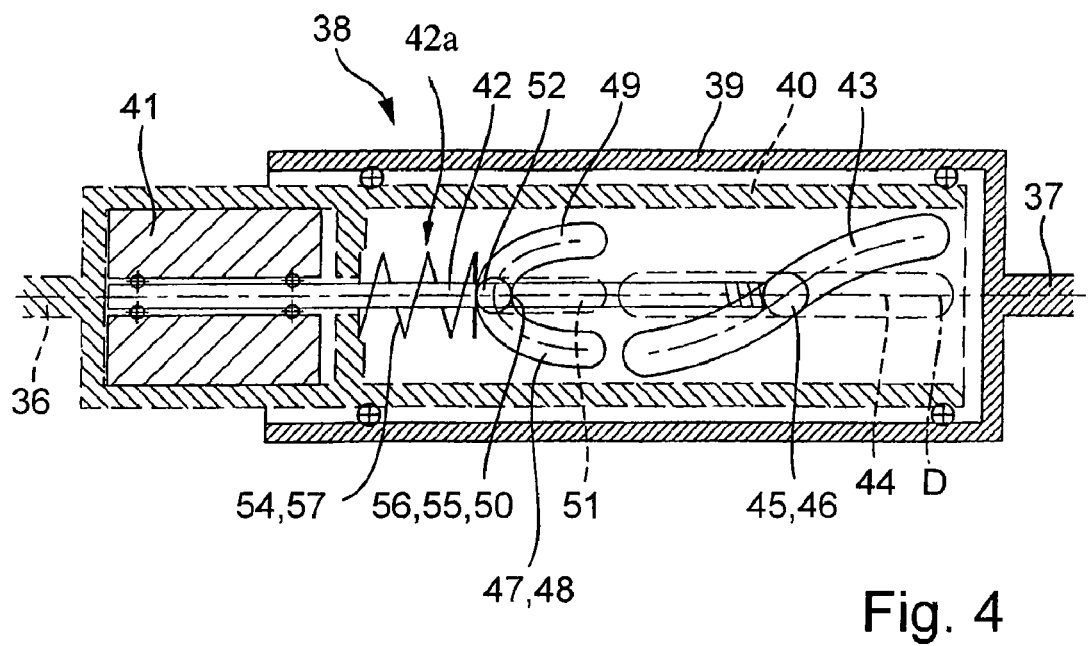
Figure 5:
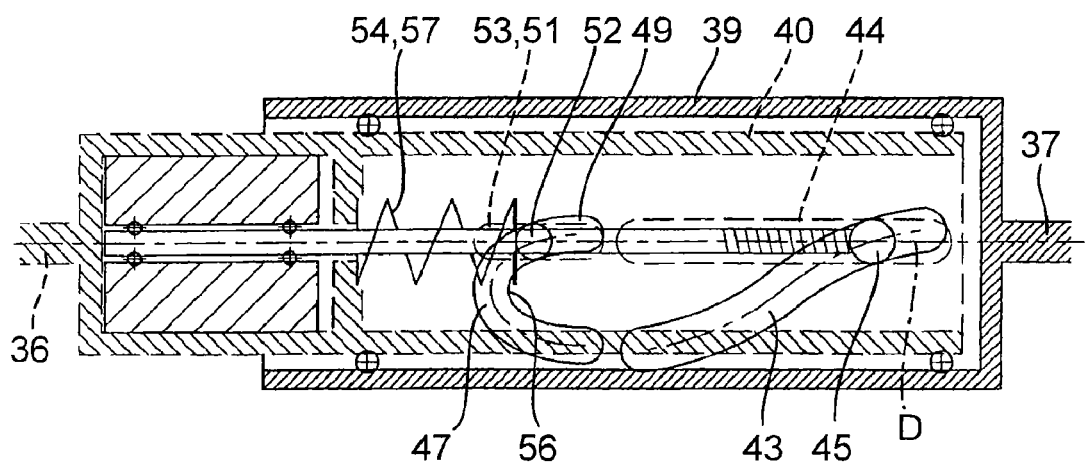

The roll stabilizer according to the invention for the chassis of a motor vehicle, shown in FIGS. 4 and 5, comprises stabilizer halves 36, 37, only indicated here. An actuator 38 is located between the stabilizer halves 36, 37, also comprising the main item of the invention. The actuator 38 rotates the two stabilizer halves 36, 37, as necessary, relative to one another around the rotational axis D of the actuator 38.

The actuator 38 is provided with two coaxially nested curved path carriers 39, 40, which are supported rotatably relative to one another but cannot be displaced axially. Here, the two curved path carriers 39, 40 are embodied in an approximately tube-shaped manner. With its right end, the exterior curved path carrier 39 is connected in a torque proof manner to the stabilizer half 37, with its left end the interior curved path carrier 40 is connected in a torque proof manner to the stabilizer half 36.

The interior curved path carrier 40 comprises an electric motor 41, with its rotor driving a threaded spindle 42. On the threaded spindle 42 a spindle nut, not shown here, in the manner of a ball drive known per se, is provided, forming in this arrangement an electromechanical actuating drive 42a. A relative rotation of the threaded spindle 42 and the spindle nut in reference to one another is converted into an axial motion of the spindle nut in reference to the curved path carriers 39, 40.

The curved path carrier 39 is provided with several curved paths 43, distributed over its circumference in an approximately S-shaped manner, as known, for example, from DE 100 02 455 A1 mentioned at the outset. The interior curved path carrier 40 is provided with several generally straight curved paths 44, distributed over the circumference, aligned parallel to the rotational axis D of the actuator 38. A coupling element 45 is arranged on the spindle nut, engaging both the S-shaped curved path 43 as well as the straight curved path 44. When the spindle nut is displaced axially together with the coupling element 45, a relative shift occurs of the coupling element 45 in reference to the curved paths 43 and 44. The coupling element 45 forms together with the curved paths 43, 44 an initial curved path transmission 46, secondary to the electromechanical actuating drive 42a.

Additionally, the exterior curved path carrier 39 is provided with several approximately U-shaped or V-shaped curved paths 47, distributed over its circumference, with their two curved path branches 48, 49 being symmetrically arranged in a mirror reflection arrangement in reference to a longitudinal central plane containing the rotational axis D of the actuator 38. The two curved path branches 48, 49 merge in an interface 50 contained in the longitudinal central plane.

At several locations distributed over its circumference, the interior curved path carrier 40 is also provided with additional generally straight curved paths 51 arranged parallel to the rotational axis D. Additional coupling elements 52 are provided, engaging the two curved paths 51, 47 and able to shift along these curved paths. With a shift of the coupling element 52 along the curved paths 51, 47, a relative rotation occurs of the two curved path carriers 39, 40 in reference to one another. The coupling element 52 forms, together with the curved paths 51, 47, a second curved path transmission 53.

The helical spring 54, arranged coaxially in reference to the threaded spindle 42, is supported, on the one hand, by the curved path carrier 40 and engages, on the other hand, the coupling element 52. In the representation according to FIG. 4, the helical spring 54 is pre-stressed and in a stop position. The stop position is ensured by a holding device 55, which is formed such that a stop position 56 is provided at the interior wall of the U-shaped curved path 47. The stop position 56 is therefore provided in the area of the interface 50.

The helical spring 54 forms an energy accumulator 57 allowing the stored resilience to perform work and rotate the two curved path carriers 39, 40 in order to counteract a roll.

As long as the helical spring 54 engages the coupling element 52 in the stop position, a neutral position of the pre-stressed helical spring 54 is adjusted. According to FIG. 4, the two coupling elements 45 and 52 are arranged in a neutral position, in which the actuator 38 is kept in a neutral position, i.e. is ineffective.

When a rolling moment is to be counteracted, the motor 41 is energized with electric current, with the rotor driving the threaded spindle 42 in a rotational direction, initiating an axial shift of the spindle nut and thus also shifts the coupling element 45 along the S-shaped curved path 43 in said direction, resulting in a rotation of the two curved path carriers 39, 40.

FIG. 5 shows an operational position of the actuator 38, in which the two curved path carriers 39, 40, and also the two stabilizer halves 36, 37 are rotated in reference to one another. The coupling element 45 is axially displaced to the right, with a relative shift of the coupling element 45 occurring along the curved paths 43, 44. With this rotation initiated by the coupling element 45, a relative shift of the coupling element 52 in reference to the curved paths 47, 51 occurs automatically. This means, that the coupling element 52 leaves its stop position 56 and is directed into the upper curved path branch 49 of the U-shaped curved path 47. With the axial pressure of the helical spring 54, the coupling element 52 is now pressed to the right, with this axial pressure creating, via the second curved path transmission, a torque effecting the two curved path carriers 39, 40 in reference to one another. This torque supports the torque provided by the first curved path transmission 46. The required electrical power of the electric motor 41 can be reduced due to the additionally effective helical spring 54. As soon as the rolling moment reduces, the motor 41 returns the coupling element 45 to its neutral position, which is approximately in the center of the S-shaped curved path. While the coupling element 45 moves said distance of displacement, a relative rotation of the two curved path carriers 39, 40 in reference to one another occurs automatically. This relative rotation also results in that the coupling element 52 is automatically shifted along the curved paths 51, 47 until the stop position has been reached. This means, that the helical spring 54 is again pre-stressed. The necessary work for pre-stressing the helical spring 54 can be provided, on the one hand, by the electric motor 41, and on the other hand, also by the chassis springs, which release resilience when the springs relax after the rolling moment has ceased.

The embodiment of the U-shaped curved path 47 and the S-shaped curved path 43 can be adjusted to one another such that the progression of the torque for rotating the two stabilizer halves 36, 37 can be optimally adjusted to the respective chassis.

The energy accumulators suggested here have been mentioned as examples only; gas pressure springs, hydraulic, or electric energy accumulators are also suitable to support the regular actuating drive. Additionally, oscillating motors or hydraulic cylinders may also be used as actuating drives.

The described roll stabilizers according to the invention are pre-fabricated components, which can be implemented without any problems between the stabilizer halves of a motor vehicle.

LIST OF REFERENCE CHARACTERS

1 Stabilizer half
2 Stabilizer half
3 Actuator
4 Curved path carrier
5 Curved path carrier
6 Housing
7 Electric motor
8 Pin catch
9 Pin catch
9a Rotor
10 Threaded spindle
11 Spindle nut
11a Actuating drive
12 Helical spring
13 Coupling element
14 Adjustment pin
15 Radial bearing
16 Support roller
17 Curved path
18 V-shaped curved path
19 Curved path branch
20 Curved path branch
20a First curved path transmission
21 Interface
22 Interior wall
23 Stop position
24 Plateau
25 Control
26 Tilting bar
27 Axis of tilting bar
28 End of tilting bar
29 End of tilting bar
30 Seating
31 Pin
32 Seating
33 Groove
33a Energy accumulator
34 Control mechanism
35 Actuating motor
36 Stabilizer half
37 Stabilizer half
38 Actuator
39 Curved path carrier
40 Curved path carrier
41 Motor
42 Threaded spindle
42a Actuating drive
43 S-shaped curved path
44 Straight curved path
45 Coupling element
46 First curved path transmission
47 U-shaped curved path
48 Curved path branch
49 Curved path branch
50 Interface
51 Straight curved path
52 Coupling element
53 Second curved path transmission
54 Helical spring
55 Stop device
56 Stop position
57 Energy accumulator

The invention claimed is:

1. Vehicle roll stabilizer for a motor vehicle chassis comprising an actuator (3, 38) that is energizable with independent energy for counteracting a roll, the actuator (3, 38) includes an additional energy accumulator (33a, 57) that stores additional energy that counteracts the roll with a counter torsional movement as the additional energy is released.

2. Vehicle roll stabilizer according to claim 1, wherein the additional energy accumulator (33a, 57) uses its energy in a single direction of relaxation to counteract the roll in one rolling direction or an opposite rolling direction.

3. Vehicle roll stabilizer according to claim 2, wherein the stabilizer is located between two stabilizer halves (1, 2, 36, 37), with the actuator (3, 38), being connected to one of the stabilizer halves (1, 36) and to the other stabilizer half (2, 37).

4. Vehicle roll stabilizer according to claim 1, wherein the additional energy accumulator (33a, 57), in a neutral position of the actuator (3, 38), stores energy for counteracting the roll by performing work.

5. Vehicle roll stabilizer according to claim 4, wherein the actuator (3, 38) performs a rotation around a rotational axis in order to rotate the stabilizer halves (1, 2, 36, 37).

6. Vehicle roll stabilizer according to claim 1, wherein a stop device (23, 55) is provided keeping the energy accumulator (33a, 57) filled with the stored energy in a neutral position of the actuator (3, 38).

7. Vehicle roll stabilizer according to claim 1, wherein the actuator (3, 38) comprises an actuating drive (11a, 42a) that is energizable with independent energy and the additional energy accumulator (12, 54, 57).

8. Vehicle roll stabilizer according to claim 7, wherein the actuating drive (11a, 42a), that can be energized with the independent energy, comprises an electric motor (7, 41) having a rotor (9a) that drives a threaded spindle (10, 42) provided with a spindle nut (11).

9. Vehicle roll stabilizer according to claim 1, wherein the additional energy accumulator comprises a spring element (12, 54).

10. Vehicle roll stabilizer according to claim 9, wherein the spring element is formed by a helical spring (12, 54), positioned generally coaxial to a rotational axis of the actuator.

11. Vehicle roll stabilizer for a motor vehicle chassis comprising an actuator (3, 38) that is energizable with independent energy for counteracting a roll, the actuator (3, 38) includes an actuating drive (11a, 42a) and an additional energy accumulator (33a, 57) that stores additional energy that counteracts the roll as the additional energy is released, wherein the actuator, arranged between the stabilizer halves (1, 2, 36, 37), is provided with a first transmission (20a, 46) secondary to an actuating drive (11a, 42a), in order to convert an adjustment path of the actuating drive (11a, 42a) into a rotational motion, by using the additional energy accumulator (33a, 57), by which the stabilizer halves (1, 2, 36, 37) are rotated in reference to one another by a rotational angle around a rotational axis of the actuator (3, 38).

12. Vehicle roll stabilizer according to claim 11, wherein the first transmission comprises a first curved path transmission (20a, 46), having two curved path carriers (4, 5, 39, 40) allocated to the stabilizer halves (1, 2, 36, 37), with a shiftable first coupling element (13, 45) being guided in the first curved paths (18, 43, 44), along said first curved paths by the actuating drive (11a, 42a).

13. Vehicle roll stabilizer according to claim 11, wherein a transmission (20a, 53), secondary to the additional energy accumulator (33a, 57), is provided in order convert an axial relaxation path of the additional energy accumulator (54, 57) into a rotational motion, by which the stabilizer halves (36, 37) are being rotated relative to one another by the rotation angle.

14. Vehicle roll stabilizer according to claim 13, wherein the transmission is provided with a curved path transmission (20a, 53) having curved path carriers (4, 5, 39, 40) allocated to the two stabilizer halves (36, 37), in which a coupling element (13, 52) that can be displaced along the curved paths (18,47,51) is guided along the curved paths (18, 47, 51), different from one another, by way of the additional energy accumulator (33a, 57).

15. Vehicle roll stabilizer according to claim 14, wherein the curved path transmission (20a, 53) is provided with a curved path (17, 51) allocated to the other curved path carrier (4, 40), extending generally straight and parallel to the rotational axis of the actuator (38).

16. Vehicle roll stabilizer according to claim 14, wherein the curved path transmission (20a, 53) is provided with an approximately V-shaped or U-shaped curved path (47) allocated to one of the curved path carriers (5, 39), with two curved path branches (19, 20, 48, 49) being arranged symmetrically in a mirror reflection arrangement relative to a longitudinal central plane containing a rotational axis of the actuator (38).

17. Vehicle roll stabilizer according to claim 16, wherein the curved path branches (19, 20, 48, 49) merge in an interface (21, 50) located on the longitudinal central plane.

18. Vehicle roll stabilizer according to claim 17, wherein the coupling element (13, 52) is energized by the additional energy accumulator (33a, 57), with the coupling element (13, 52) being located in an area of the interface (21, 50) in a neutral position.

19. Vehicle roll stabilizer according to claim 18, wherein a stop device (23, 55) is provided, by which the coupling element (13, 52) is held in the area of the interface (21, 50).

* * * * *